United States Patent
Matthews et al.

(10) Patent No.: US 8,745,238 B2
(45) Date of Patent: Jun. 3, 2014

(54) VIRTUAL HOT INSERTING FUNCTIONS IN A SHARED I/O ENVIRONMENT

(75) Inventors: David L. Matthews, Cypress, TX (US); Hubert E. Brinkmann, Spring, TX (US); Paul V. Brownell, Houston, TX (US); Barry S. Basile, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 24 days.

(21) Appl. No.: 13/375,197

(22) PCT Filed: Jul. 17, 2009

(86) PCT No.: PCT/US2009/050995
§ 371 (c)(1),
(2), (4) Date: Nov. 29, 2011

(87) PCT Pub. No.: WO2011/008215
PCT Pub. Date: Jan. 20, 2011

(65) Prior Publication Data
US 2012/0131201 A1    May 24, 2012

(51) Int. Cl.
*G06F 15/173* (2006.01)
*G06F 15/16* (2006.01)
*G06F 9/455* (2006.01)
*G06F 9/46* (2006.01)

(52) U.S. Cl.
USPC .......................................... 709/226

(58) Field of Classification Search
USPC ........................ 709/226; 718/1, 105
See application file for complete search history.

(56) References Cited

U.S. PATENT DOCUMENTS

| | | | |
|---|---|---|---|
| 7,480,720 B2 * | 1/2009 | Chu et al. | 709/226 |
| 2008/0147937 A1 | 6/2008 | Fedimuth et al. | |
| 2008/0148295 A1 | 6/2008 | Fedimuth et al. | |
| 2009/0089464 A1 * | 4/2009 | Lach et al. | 710/62 |

OTHER PUBLICATIONS

International Searching Authority, The International Search Report and the Written Opinion, Apr. 16, 2010, 11 PAges.

* cited by examiner

*Primary Examiner* — Tonia L Dollinger
*Assistant Examiner* — Adam Cooney

(57) ABSTRACT

A blade server system and method for virtually hot plugging and virtually hot removing functions in a shared I/O environment. A management node physically hot inserts and hot removes an I/O node in the server system without a compute node being aware of the hot insert and hot removal. The management node and the compute node create and remove virtual links between the compute node and the virtual functions.

16 Claims, 6 Drawing Sheets

VIRTUAL HOT INSERTING FUNCTIONS IN A SHARED I/O ENVIRONMENT

BACKGROUND

Blade servers are self-contained all inclusive computer servers, designed for high density. Blade servers have many components removed for space, power and other considerations while still having all the functional components to be considered a computer (i.e., memory, processor, storage).

The blade servers are housed in a blade enclosure. The enclosure can hold multiple blade servers and perform many of the non-core services (i.e., power, cooling, I/O, networking) found in most computers. By locating these services in one place and sharing them amongst the blade servers, the overall component utilization is more efficient.

In a non-shared I/O environment, there is a direct physical link between a host computer on a compute node and an I/O node. The functions of the I/O node are typically assigned to a single host. Thus, when an I/O node is inserted into the server system, one of the hosts can request its functions and the management module for the server enclosure assigns the functions of that I/O node to the requesting host. In other embodiments, the assignments of I/O functions are made implicitly by blade and I/O node slot mappings designated by the enclosure manufacturer.

These types of enclosures are not very efficient because other hosts cannot utilize I/O node functions until the host presently using the I/O function gives up control. Additionally, there might be functions on a particular I/O node that are not being used by the assigned host but could be used by other hosts in the system.

Virtualization of functions in a shared I/O environment enables functions of an I/O node to be shared across many hosts. Once the function is assigned to a host, the host thinks that it owns the I/O function. However, adding and removing functions from the host's assigned functions means executing the normal physical steps for adding and removing I/O nodes.

DETAILED DESCRIPTION

The following detailed description is not to be taken in a limiting sense. Other embodiments may be utilized and changes may be made without departing from the scope of the present disclosure.

Figure 1:
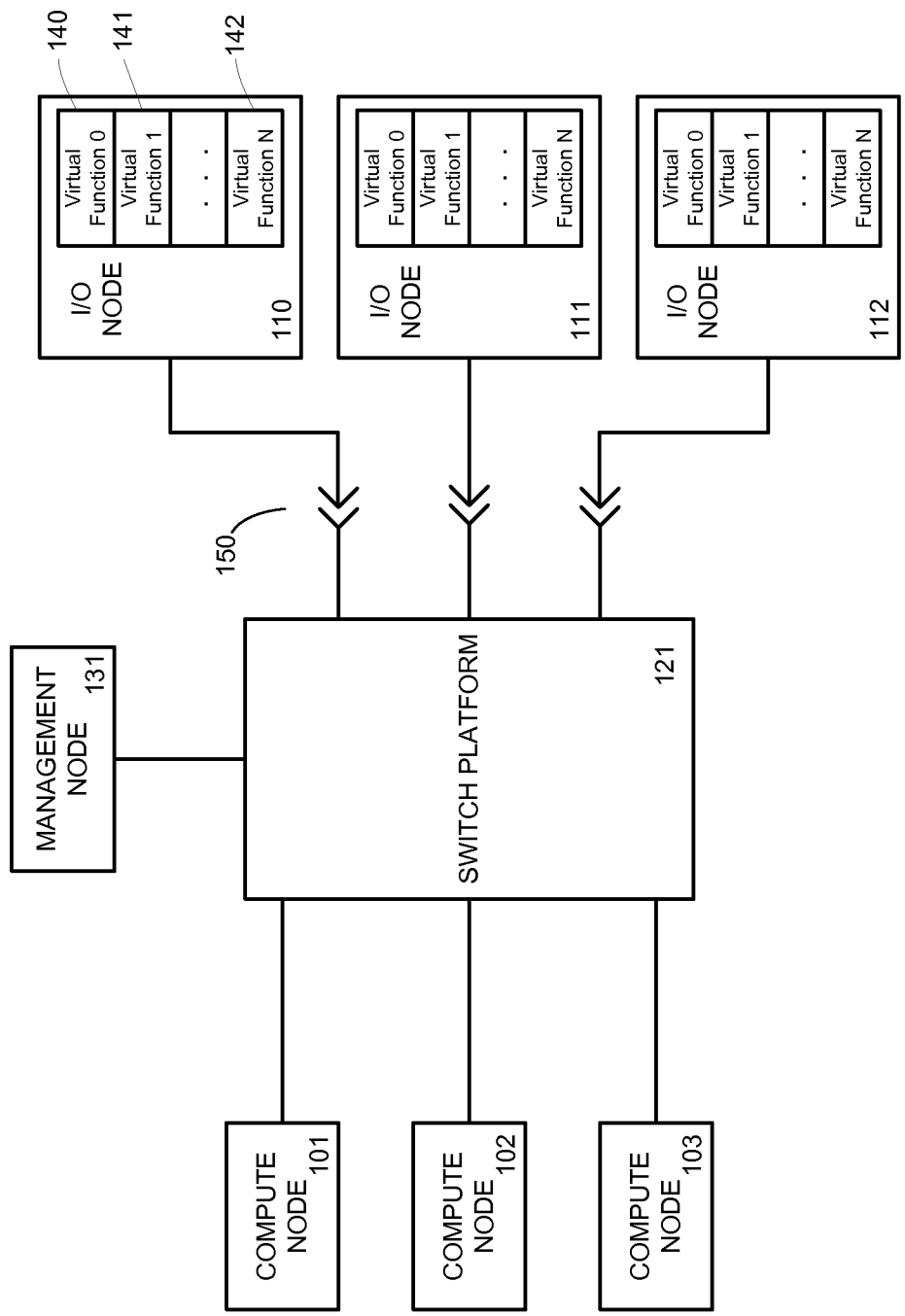
FIG. 1 depicts a block diagram of one embodiment of a server system.

FIG. 1 illustrates a block diagram of one embodiment of a server system that can incorporate the virtual hot plugging functions of the present embodiments. The illustrated embodiment has been simplified to better illustrate the operation of the virtual hot plugging functions. Alternate embodiments may use other functional blocks in which the virtual hot plugging functions can operate.

The system is comprised of a plurality of compute nodes 101-103. In one embodiment, the compute nodes 101-103 can be blade servers. The servers may be comprised of components that include a processor, memory, and I/O interfaces (e.g., PCI Express).

The system is further comprised of I/O nodes 110-112. The I/O nodes 110-112 can be typical I/O devices that are used in a computer server system. The I/O nodes 110-112 are each comprised of one or more virtual functions 140-142. Such I/O functions can include serial and parallel I/O, fiber I/O, switches (e.g., Ethernet switches), and other functions.

The I/O nodes 110-112 are coupled to the compute nodes 101-103 through a switch platform 121. Any one of the I/O nodes 110-112 can be switched to any one of the compute nodes 101-103 through the switch platform 121.

The I/O nodes 110-112 are each coupled to the switch platform 121 through a physical hot plug connection 150. This connection 150, in one embodiment, is one or more connectors in the blade server system. Physical hot insertion of the I/O nodes is discussed subsequently with reference to the flow chart of FIG. 3.

Control of the switch 121 is performed by a management node 131. The management node 131 is comprised of a controller and memory that enables it to execute the control routines to control the switches.

The server system of FIG. 1 is for purposes of illustration only. Other server systems can be comprised of different quantities of compute nodes, I/O nodes, and switches. The embodiments of the method for virtual hot plugging of functions in a shared I/O environment can be executed in any type of server system or computer system.

Since a server system can be comprised of multiple blade servers and each server can run multiple applications under multiple operating systems, such a server typically needs increased network bandwidth and more network connections as compared to a typical computer. And since the server resources are shared among multiple applications, ensuring the performance and availability of critical apps becomes more difficult.

In traditional server environments, these issues can be resolved by resource segregation. Each server runs only one application, and each is provided with separate I/O resources. This type of server provides multiple physically distinct networks.

With virtualization, a flexible pool of resources can be created that can be deployed as needed. Any server can ideally run any application. This means that a single blade server now needs sufficient connectivity for all of the applications it hosts. Instead of having multiple cards and cables per server, I/O virtualization employs a single high-speed I/O link that is logically managed as multiple virtual resources. Analogous to multiple virtual machines running on a single physical server, virtual I/O enables the creation of multiple virtual network interface cards (vNICs) for network connectivity and virtual host bus adaptors (vHBAs). These virtual cards behave substantially the same as the physical Ethernet and Fiber Channel cards they are designed to replace. Since the vNICs and vHBAs remain logically distinct, they create network and storage connections that also remain logically distinct.

The embodiments of the method for virtual hot plugging of virtualized functions in a shared I/O environment, such as the system illustrated in FIG. 1, provides dynamic allocation of I/O functions across multiple hosts. The present embodiments also provide for dynamically removing these functions without physically removing any of the I/O cards.

Figure 2:
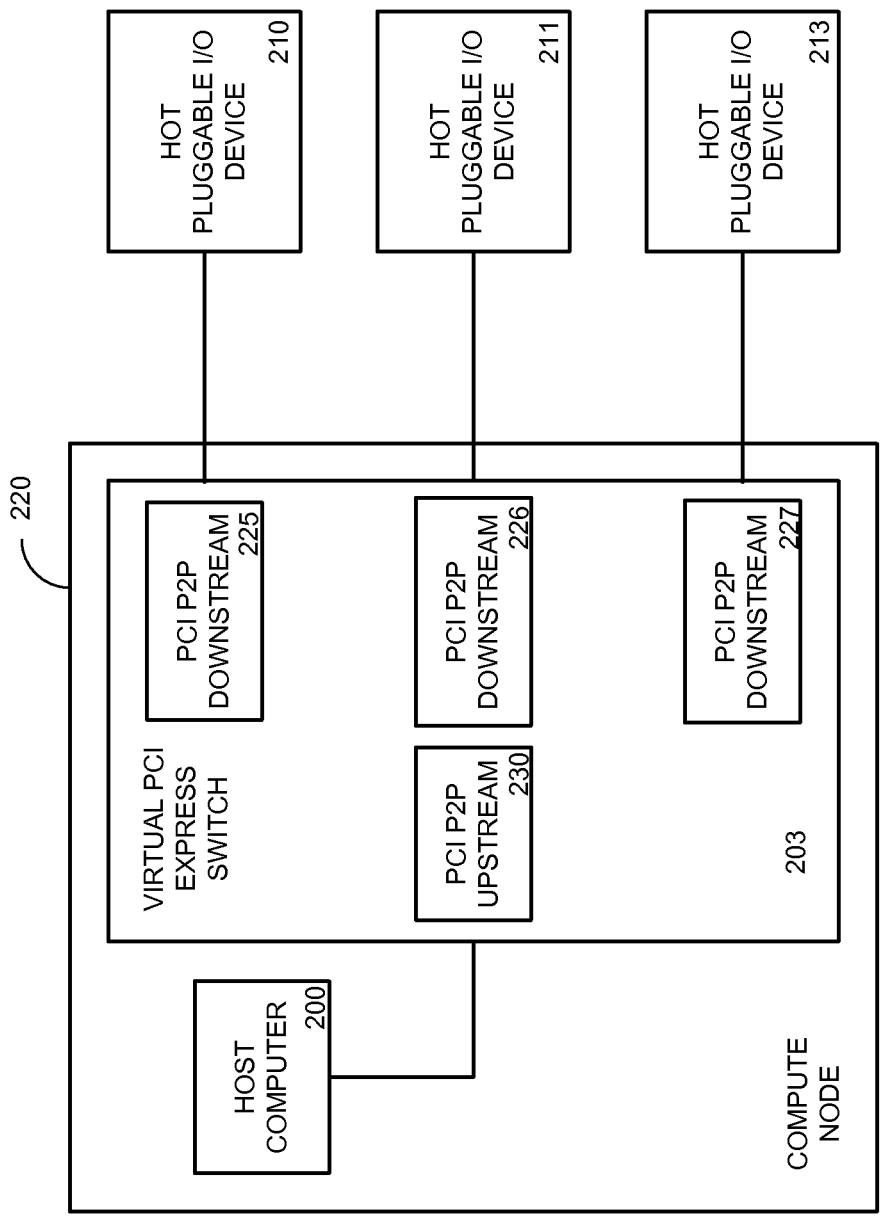
FIG. 2 depicts a host view of virtual functions assigned to the host.

FIG. 2 illustrates a conceptual block diagram of one embodiment of a server system incorporating the virtual hot plugging functions of the present embodiments. Such a conceptual system can be configured using the system illustrated in the block diagram of FIG. 1.

The conceptual system is comprised of a compute node 220 (e.g., blade servers) with at least one host computer 200 that executes code to control virtual functions. The compute node 220 has a virtual PCI Express switch component 203 that can be coupled to the compute node's mezzanine connector and acts as a bridge between the host computer 200 and a plurality of hot pluggable I/O devices 210-213.

The plurality of hot pluggable I/O devices 210-213 represent the virtual functions that are resident on the I/O nodes of FIG. 1. In one embodiment, it is possible that all of the hot pluggable end devices 210-213 can be resident on only one of the I/O nodes. Alternate embodiments can have the hot pluggable end devices 210-213 on different I/O nodes.

The virtual PCI Express switch 203 is comprised of a downstream PCI-to-PCI bridge device 225-227 for each virtual connection to a virtual hot pluggable I/O device (i.e., virtual function). A PCI PCI-to-PCI upstream interface 230 couples the host computer 200 to the virtual PCI Express switch 203.

The hot insertion embodiments of the present disclosure encompass physical hot insertion of an I/O node, as discussed subsequently in FIG. 3, and virtual hot insertion of a virtual function from the I/O node, as discussed subsequently in FIG. 4. The embodiments also encompass virtual hot removal of the virtual function from the I/O node, as discussed subsequently in FIG. 5, and physical hot removal of the I/O node, as discussed subsequently in FIG. 6.

Figure 3:
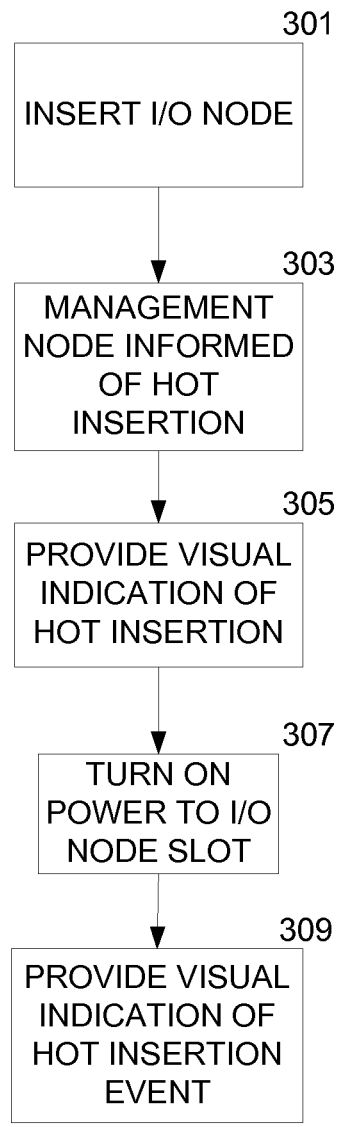
FIG. 3 depicts a flow chart of one embodiment of a method for physical hot insertion of the new I/O node in accordance with the method of FIG. 3.
Figure 4:
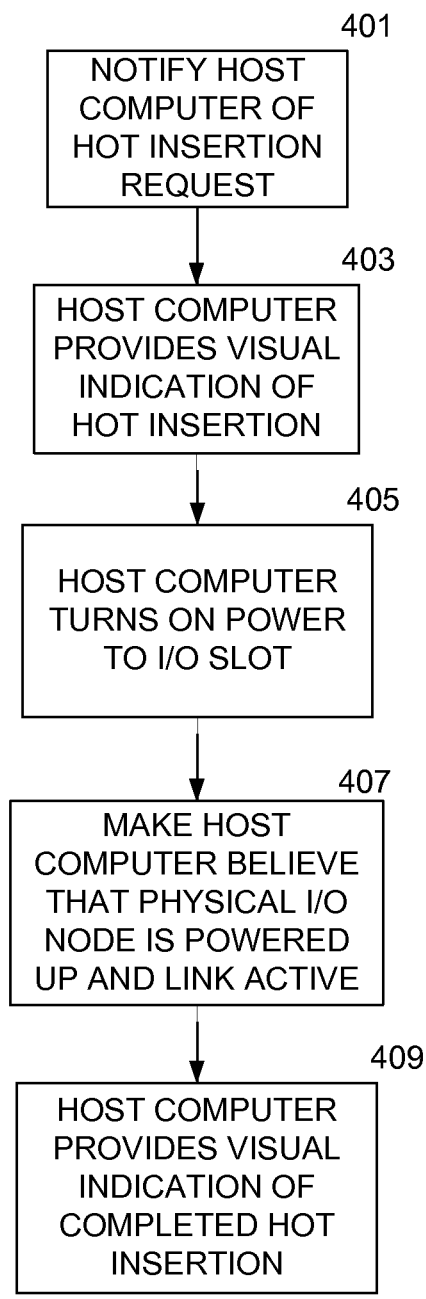
FIG. 4 depicts a flow chart of one embodiment of a method for virtual hot insertion of a virtual I/O function.

FIG. 3 illustrates a flow chart of one embodiment of a method for physical hot insertion of a new I/O node in a server system. In one embodiment, this method can be handled by the management node with the compute node uninvolved and unaware of the insertion event.

The new I/O node hardware is inserted into the system 301. The management node is then notified that a hot insertion is being requested 303. This notification can take the form of the user pushing an attention button to send an interrupt to the management node indicating that a new card has been inserted into a particular slot of the chassis. For example, the user might interface with a keyboard and monitor or a touch screen input device that allows selection of the type of card and the slot into which the card has been inserted. In another embodiment, circuitry on the inserted card automatically sends a signal to the management node that it has been inserted. The inserted card can also include embedded information interrogated by the management node to ascertain the various functions available on the new hardware.

The management node provides a visual indication that the hot plug operation is in progress 305. This can be accomplished by the management node setting indicator control bits on the switch platform. The management node then turns on power to the I/O slot 307. In one embodiment, this is accomplished by the management node setting power control bits on the switch platform.

The management node provides a visual indication that the hot plug operation is complete 309. The management node can perform this by setting the power indicator control bits on the switch platform.

At this point, the compute node is still unaware that an I/O resource has been added. The management node can then control the connections of the virtual functions to the compute node as discussed subsequently with reference to FIG. 4.

Once connected, each virtual function will appear to be a single function I/O device to the compute node.

The management node connects virtual functions to the compute nodes based on resource requests that can be provided through a console connected to the management node. FIG. 4 illustrates a flow chart of one embodiment of a method for virtual hot insertion of a virtual function. This embodiment can also be referred to as a hot add event wherein power is virtually added to a virtual function on an existing I/O device. This embodiment involves both the management node and the compute node. The management node controls bits in the slot control register of the appropriate PCI-to-PCI downstream configuration spaces as necessary to make the virtual hot insertion of one of the virtual functions to appear to be an actual physical hot insertion.

The host computer is notified that a hot insertion operation is being requested 401. This can be accomplished by the management node setting the attention button pressed bit in the slot status register in the downstream PCI-to-PCI bridge device. This is equivalent to a virtual "push" of the attention switch.

The compute node was initially unaware of the physical hot insertion of the I/O node. Only after the management node has changed the appropriate control bits does the compute node recognize and believe that a physical device has now been hot inserted. The compute node will then perform a PCI enumeration that discovers, initializes, and enables the newly-added virtual functions.

The host computer provides a visual indication that the hot insertion operation is in progress 403. This may be accomplished by the host computer setting power indicator control bits in the slot control register in the downstream PCI-to-PCI bridge device. The management node is interrupted when these bits are set.

The host computer then turns on power to the I/O slot 405 by using the power control bits in the slot control register in the downstream PCI-to-PCI bridge device. The management node is interrupted when these bits are set. The host computer believes that it is requesting that power be applied to the physical I/O node but in reality, the management node has done this at a much earlier time.

In response to the "power on" request from the host computer, the management node makes the host computer believe that the physical I/O node has been powered up and the PCI Express link is now active 407. In one embodiment, this is done by the management node setting the data link layer active bit in a link status register and the data link layer state changed bit in the slot status register in the downstream PCI-to-PCI bridge device.

The host computer provides a visual indication that the hot insertion operation is complete 409 by setting the power indicator control bits in the slot control register in the downstream PCI-to-PCI bridge device to the "on" state. The management node is interrupted when these bits are set and is thus informed that the virtual hot insertion operation is complete.

Figure 5:
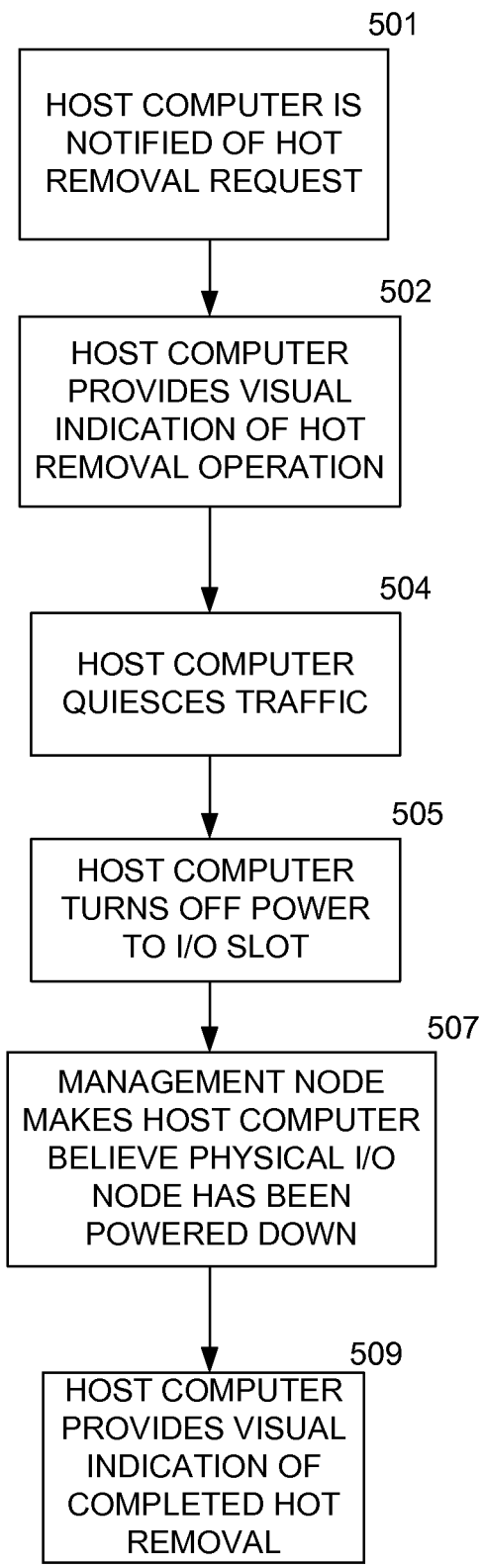
FIG. 5 depicts a flow chart of one embodiment of a method for virtual hot removal of a virtual I/O function.

FIG. 5 illustrates a flow chart of one embodiment of a method for virtual hot removal of a virtual function. This method involves both the management node and the compute node. The management node controls bits in the slot control register of the appropriate downstream PCI-to-PCI bridge configuration spaces as necessary to make the virtual hot removal of one of the virtual functions appear to be the physical hot removal of the physical I/O node.

The management node removes the virtual functions from the compute nodes based on the resource requests that can be provided through a console connected to the management node. Since the compute node believes that a physical single-function device has been hot removed, it will quiesce, disable and power down the function.

The host computer is informed of the hot removal operation request 501. This can be accomplished by the management node setting the attention button pressed bit in the slot status register. This provides a virtual "push" of the attention switch.

The host computer provides visual indication that the hot removal operation is in progress 502. This is accomplished by the host computer setting power indicator control bits in the slot control register to the "blink" state. The management node is interrupted when these bits are set.

The host computer then quiesces traffic to and from the indicated I/O device 504. The host computer turns off power and the power indicator of the slot 505 by setting the setting power control bits in the slot control register. The management node is interrupted when these bits are set. The host computer believes that this particular physical I/O device is being powered down.

In response to the power off request, management node makes the host computer believe that the physical I/O node has been powered down 507. This can be accomplished by the management node clearing the data link layer active bit in the link status register and setting the data link layer state changed bit in the slot status register.

The host computer then provides a visual indication that the hot removal operation is complete 509 by setting the power indicator control bits in the slot control register to the "off" state. The management node is interrupted when these bits are set and now knows that the virtual hot removal operation is complete.

Figure 6:
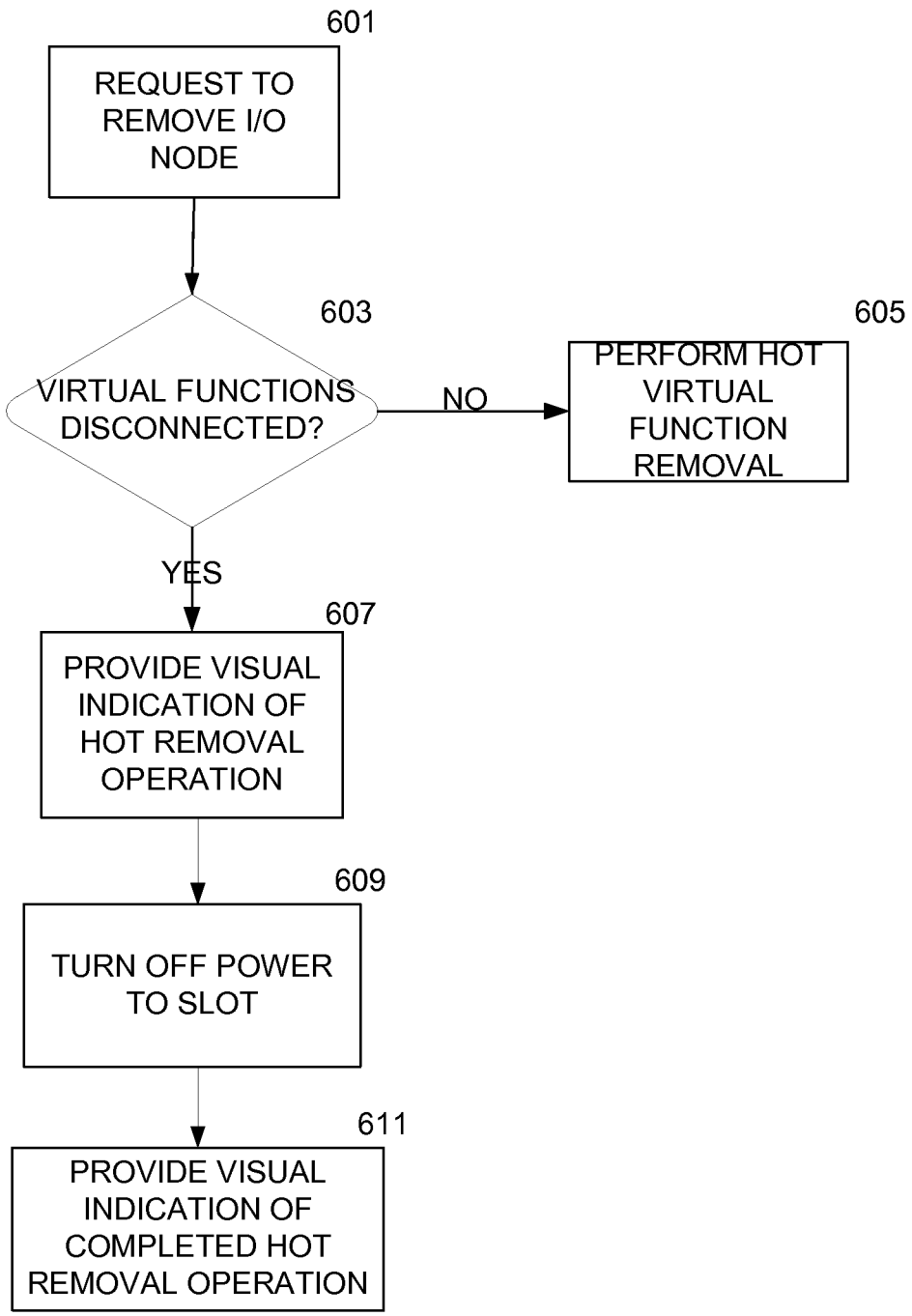
FIG. 6 depicts a flow chart of one embodiment of a method for physical hot removal of an I/O node from the server system.

FIG. 6 illustrates a flow chart of one embodiment of a method for requesting physical removal of an I/O device from a server system. Since the compute node believes that the physical I/O node has already been removed, this method is performed by the management node while the compute node is unaware of the event. The connections between the host computers and the virtual functions in the I/O node are virtually removed before physical hot removal of the I/O node.

A request is received to remove the physical I/O device 601. This can be accomplished by a user pressing an attention button assigned to the physical slot of the I/O device. The I/O node signals the management node of the request to remove the physical I/O device. In one embodiment, the I/O node sends an interrupt to the management node to request removal.

The management node provides a visual indication that the hot removal operation is in progress 607. This is accomplished by the management node setting power indicator bits to the "blink" state on the switch platform.

The management node then verifies that virtual functions are not virtually connected (in service) to the host computers 603. If the I/O node still has active connections to some of the host computers, the management node virtually hot removes all of the connected virtual functions 605.

Once it has verified that all virtual functions are removed 603, the management node then turns off the power to the I/O node slot 609. The management node can accomplish this by using the power control bits on the switch platform.

The management node then provides a visual indication that the hot removal operation is complete 611 by setting the power indicator control bits on the switch platform to the "off" state.

In summary, a method for virtually hot plugging and virtually hot removing functions in a shared I/O environment has been disclosed. When sharing I/O functions across multiple hosts, some of the I/O functions may not be used. The present embodiments enable dynamic resourcing of these unused functions. The unused functions can also be dynamically removed in a virtual manner without the physical removal of the I/O device from the server system.

What is claimed is:

1. A method for virtual hot inserting functions in a server system, the method comprising:
   physically coupling an I/O node to the server system and powering up the I/O node, the I/O node comprising a plurality of functions;
   subsequent to powering up the I/O node, notifying a first host computer in the server system that a hot insertion operation is being requested, wherein the requested hot insertion operation is associated with a first function of the plurality of functions;
   in response to the notification of the requested hot insertion operation, virtually coupling the first host computer to the first function comprising requesting from the first host computer that power be applied to the I/O node, and subsequently indicating to the first host computer that the I/O node has been powered up; and
   virtually sharing the plurality of functions amongst a plurality of host computers in the server system including the first host computer.

2. The method of claim 1 wherein virtually coupling comprises:
   the first host computer of the plurality of host computers setting a virtual power control indication for the first function of the plurality of functions;
   setting a virtual indication that a data link layer is active; and
   signaling that a virtual link between the first host computer and the first function is active.

3. The method of claim 2 wherein setting the virtual indication that the data link layer is active comprises a management node setting a data link layer active bit in a link status register.

4. The method of claim 3 wherein the management node setting the data link layer active status bit comprises setting the data link layer active status bit in response to the first host computer setting the virtual power control indication.

5. The method of claim 1 wherein virtually coupling comprises setting up a virtual connection between the first host computer of the plurality of host computers and the first function of the plurality of functions.

6. The method of claim 2 and further comprising the first host computer enumerating virtual functions assigned to the first host computer.

7. The method of claim 2 and wherein signaling that the virtual link between the first host computer and the first function is active includes providing a visual indication of completion of the virtual hot insertion.

8. A method for virtual hot removal of functions in a server system, the method comprising:
   virtually indicating a hot removal request of a first function of a plurality of functions on an I/O node;
   virtually removing a virtual link of the first function to a first host computer, comprising requesting from the first host computer that the I/O node be powered down; and
   indicating to the first host computer that the I/O node has been powered down without powering down the I/O node.

9. The method of claim 8 and further including physically removing the I/O node from the server system after removing the virtual link.

10. The method of claim 8 wherein virtually removing the virtual link comprises:
the first host computer quiescing traffic to the first function;
the first host computer setting power control bits to request that the I/O node be powered down and to turn off power to the function; and
a management node clearing a data link layer active bit in a link status register to indicate to the first host computer that the I/O node has been powered down without powering down the I/O node.

11. The method of claim 8 wherein virtually indicating the hot removal request of the first function comprises a management node setting an attention button pressed bit in an I/O node status register.

12. The method of claim 10 and further including the first host computer providing a visual indication of completion of the virtual hot removal of the first function.

13. A server system incorporating a plurality of virtual functions, the system comprising:
a plurality of compute nodes each configured to virtually couple to at least one virtual function of the plurality of virtual functions;
an I/O node comprising the plurality of virtual functions;
a switch platform that couples a plurality of host computers to the I/O node; and
a management module coupled to the switch platform and configured to virtually hot insert and virtually hot remove virtual links between each of the plurality of compute nodes and the at least one virtual function;
wherein a virtual hot insertion comprises notifying a compute node in the server system that a hot insertion operation is being requested subsequent to powering up the I/O node, requesting from that compute node that power be applied to the I/O node in response to the notification of the hot insertion operation, and subsequently indicating to that compute node that the I/O node has been powered up.

14. The system of claim 13 wherein only the management node is further configured to physically hot insert and physically hot remove the I/O node to and from the server system.

15. The system of claim 13 wherein both a first compute node and the management node are configured to virtually hot insert and virtually hot remove the virtual link between the first compute node and the at least one virtual function.

16. The system of claim 13 wherein a virtual hot removal comprises requesting from a compute node in the server system that the I/O node be powered down, and indicating to that compute node that the I/O node has been powered down without powering down the I/O node.

* * * * *